US011623316B2

(12) United States Patent
Schoop

(10) Patent No.: US 11,623,316 B2
(45) Date of Patent: Apr. 11, 2023

(54) TESTBED DEVICE FOR USE IN PREDICTIVE MODELLING OF MANUFACTURING PROCESSES

(71) Applicant: University of Kentucky Research Foundation, Lexington, KY (US)

(72) Inventor: Julius Schoop, Lexington, KY (US)

(73) Assignee: University of Kentucky Research Foundation, Lexington, KY (US)

( * ) Notice: Subject to any disclaimer, the term of this patent is extended or adjusted under 35 U.S.C. 154(b) by 377 days.

(21) Appl. No.: 16/856,533

(22) Filed: Apr. 23, 2020

(65) Prior Publication Data

US 2020/0338680 A1    Oct. 29, 2020

Related U.S. Application Data

(60) Provisional application No. 62/837,330, filed on Apr. 23, 2019, provisional application No. 62/837,357, filed on Apr. 23, 2019.

(51) Int. Cl.
*B23Q 17/24* (2006.01)
*B23Q 16/00* (2006.01)
*B23Q 15/18* (2006.01)

(52) U.S. Cl.
CPC ........... *B23Q 17/249* (2013.01); *B23Q 15/18* (2013.01); *B23Q 16/004* (2013.01); *B23Q 17/2428* (2013.01)

(58) Field of Classification Search
CPC ............... B23Q 17/09; B23Q 17/0952; B23Q 17/0966; B23Q 17/098; B23Q 17/0985; B23Q 17/12; B23Q 17/24; B23Q 17/2409; B23Q 17/2404; B23Q 17/2495; B23Q 17/249

See application file for complete search history.

(56) References Cited

U.S. PATENT DOCUMENTS

| | | | | |
|---|---|---|---|---|
| 5,481,401 | A * | 1/1996 | Kita | G02B 21/365 359/380 |
| 6,352,507 | B1 | 3/2002 | Torp et al. | |
| 6,517,485 | B2 | 2/2003 | Torp et al. | |
| 6,676,599 | B2 | 1/2004 | Torp et al. | |
| 7,289,873 | B2 * | 10/2007 | Redecker | B23Q 1/0009 340/310.17 |
| 7,798,965 | B2 | 9/2010 | Torp et al. | |
| 10,281,902 | B2 * | 5/2019 | Coffman | B33Y 50/00 |
| 11,119,019 | B2 * | 9/2021 | Staub | G01N 21/91 |
| 2004/0083868 | A1 * | 5/2004 | Ohmiya | B23Q 17/24 83/99 |
| 2005/0040729 | A1 * | 2/2005 | Gondoh | H02N 1/004 310/309 |

FOREIGN PATENT DOCUMENTS

| | | | | |
|---|---|---|---|---|
| CN | 106807975 A | * | 6/2017 | |
| CN | 107350900 A | * | 11/2017 | ............. B23Q 17/09 |

(Continued)

*Primary Examiner* — Boyer D Ashley
*Assistant Examiner* — Reinaldo A Vargas Del Rio
(74) *Attorney, Agent, or Firm* — Stites & Harbison PLLC; Warren D. Schickli

(57) ABSTRACT

A testbed device includes high performance actuators, a video microscopy system and a plurality of high resolution, throughput sensors adapted or configured for collecting data that may be used in predictive modelling of machine processes.

17 Claims, 9 Drawing Sheets

(56) References Cited

FOREIGN PATENT DOCUMENTS

| DE | 202017105356 U1 | * | 10/2017 | |
|----|-----------------|---|---------|---|
| EP | 1341005 A2 | * | 9/2003 | ............... G01V 3/15 |
| WO | WO-9746004 A1 | * | 12/1997 | ............. H04N 5/335 |
| WO | WO-2009142879 A2 | * | 11/2009 | ......... G06F 3/04883 |
| WO | WO-2016199046 A1 | * | 12/2016 | ............. B23Q 17/22 |

* cited by examiner

TESTBED DEVICE FOR USE IN PREDICTIVE MODELLING OF MANUFACTURING PROCESSES

RELATED APPLICATION

This application claims priority to U.S. Provisional Patent Application Ser. Nos. 62/837,330 and 62/837,357 filed on Apr. 23, 2019, which are hereby incorporated by reference in their entirety.

TECHNICAL FIELD

This document relates generally to the fields of tribology, finishing and machining and, more particularly, to a new and improved testbed device adapted or configured for use in predictive modelling of machining and finishing processes, such as burnishing and polishing.

BACKGROUND

State of the art approaches for modelling of machining processes suffer from a number of inherent limitations. For example, tensile, pressure plate or split Hopkinson bar test data does not realistically represent the conditions of hydrostatic stress, strain rate and the temperature gradients during the machining process.

This document relates to a new and improved testbed device particularly useful in predictive modelling of machining and finishing processes. The testbed device enables the in-situ generation of highly detailed image sequences and time-correlated sensor data at realistic cutting speeds up to almost 900 sfm (270 m/min or 4.5 m/s) that can be analyzed using advanced digital image correlation (DIC) and/or particle image velocimetry (PIV) techniques. The DIC/PIV analysis reveals characteristic contact lengths, as well as complex strain and strain rate fields which, in turn, may be correlated with synchronized force, temperature, vibration and acoustic emission data collected using a plurality of advanced sensors. Thus, for the first time, it is possible to fully characterize dynamic material behavior (constitutive stress/strain/temperature relationship) during the machining process.

SUMMARY

A new and improved testbed device comprises: (a) a base, (b) a displaceable machine table supported on the base, (c) a sample holder supported on the displaceable machine table, (d) a displaceable spindle supported on the base, (e) a video microscopy system, including a camera, a microscope and a light source, (f) a plurality of sensors and (g) a control module. The plurality of sensors are adapted to measure force, vibration and thermal emission. The control module includes a controller, an X-actuator, a Y-actuator and a Z-actuator wherein the controller is adapted to (1) control the X-actuator, the Y-actuator and the Z-actuator, (2) receive data from the plurality of sensors and (3) receive data images from the video microscopy system.

In at least one of the many possible embodiments, the testbed device includes a tool holder carried on the displaceable spindle. The tool holder is adapted to hold a cutting or burnishing tool.

In at least one of the many possible embodiments, the plurality of sensors include at least one of a tool acoustic emission sensor integrated into the tool holder, a sample acoustic emission sensor integrated into the sample holder, a tangential force load cell integrated into the tool holder and at least one vertical force load cell integrated into the displaceable machine table. In one particularly useful embodiment of the testbed device, the testbed device incorporates all of these sensors. The sensors may have a sampling rate of at least 2 MHz/channel.

In at least one of the many possible embodiments, the testbed device further includes a carbon fiber rod assembly integrated into the tool holder, a first laser interferometer targeting a first target element at a first end of the carbon fiber rod along a first line and a second laser interferometer targeting a second target element at a second end of the carbon fiber rod along a second line perpendicular to the first line.

The camera has a frame speed of at least 10,000 frames per second. In a more preferred embodiment, the camera has a frame speed of at least 500,000 frames per second. In one particularly useful embodiment, the camera has a frame speed of between 10,000 and 2,100,000 frames per second. In at least one possible embodiment, the microscope provides image magnification of between 5× and 50×. In at least one embodiment, the light source provides greater than 250 million lux. A sapphire constraint between the video microscopy system and the sample provides a clear viewing window during machining. As a result, the video microscopy system is capable of providing optical resolution of approximately 550 nm at 50× magnification.

In at least one of the many possible embodiments, the X-actuator, the Y-actuator and the Z-actuator all provide greater than 5 Gs of acceleration, 4.5 m/s of peak speed and 50 nm absolute encoder position feedback.

In at least one of the many possible embodiments, the testbed device includes a stationary proximity sensor and a data acquisition marker supported on the displaceable machine table adapted to initiate and end data acquisition and synchronize operation of the sensors and video microscopy system.

In the following description, there are shown and described several preferred embodiments of the testbed device. As it should be realized, the testbed device is capable of other, different embodiments and its several details are capable of modification in various, obvious aspects all without departing from the testbed device as set forth and described in the following claims. Accordingly, the drawing figures and descriptions should be regarded as illustrative in nature and not as restrictive.

BRIEF DESCRIPTION OF THE DRAWING FIGURES

The accompanying drawing figures incorporated herein and forming a part of the patent specification, illustrate several aspects of the testbed device and together with the description serve to explain certain principles thereof.

DETAILED DESCRIPTION

Figure 1A:
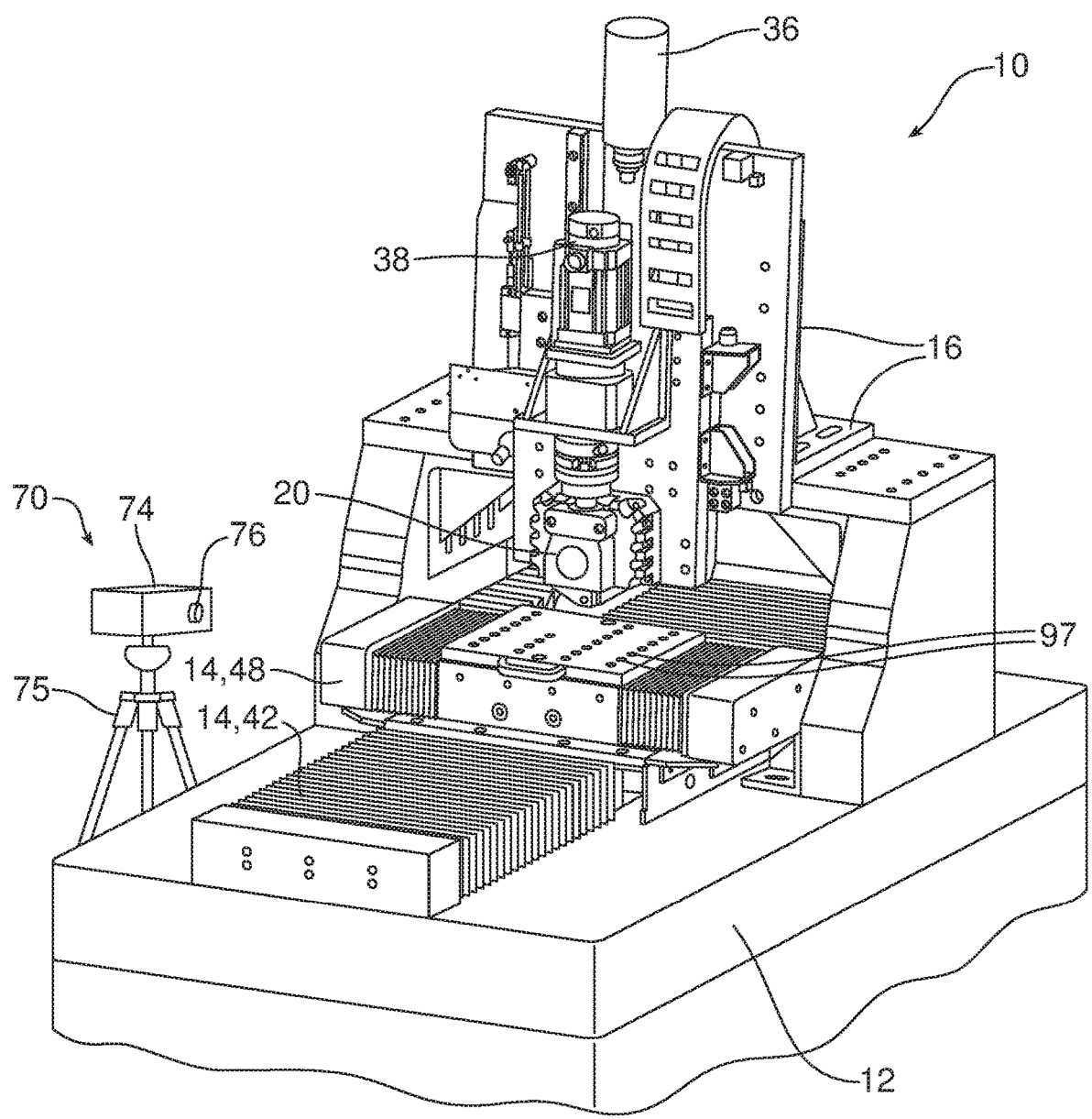
FIG. 1A is a perspective view of the testbed device adapted for use in predictive modelling of machine processes (sample holder not shown).

Reference is now made to FIGS. 1A-1D and 2 that illustrate the new and improved testbed device 10 adapted for use in predictive modelling of machine processes. As illustrated, the apparatus 10 includes a base 12. The base 12 may comprise, for example, a four ton granite surface plate. A displaceable machine table 14 is supported for displacement on the base 12.

The base 12 includes a column 16. A displaceable spindle 18 is supported on the column 16 of the base 12. The spindle 18 includes a tool holder 20. A cutting tool 22 is releasably held in the tool holder 20 on the spindle. The cutting tool 22 includes a single point 24 for cutting the workpiece/sample W. For some process studies, the cutting tool 22 may be a sharp, transparent sapphire tool of a type known in the art.

Figure 3:
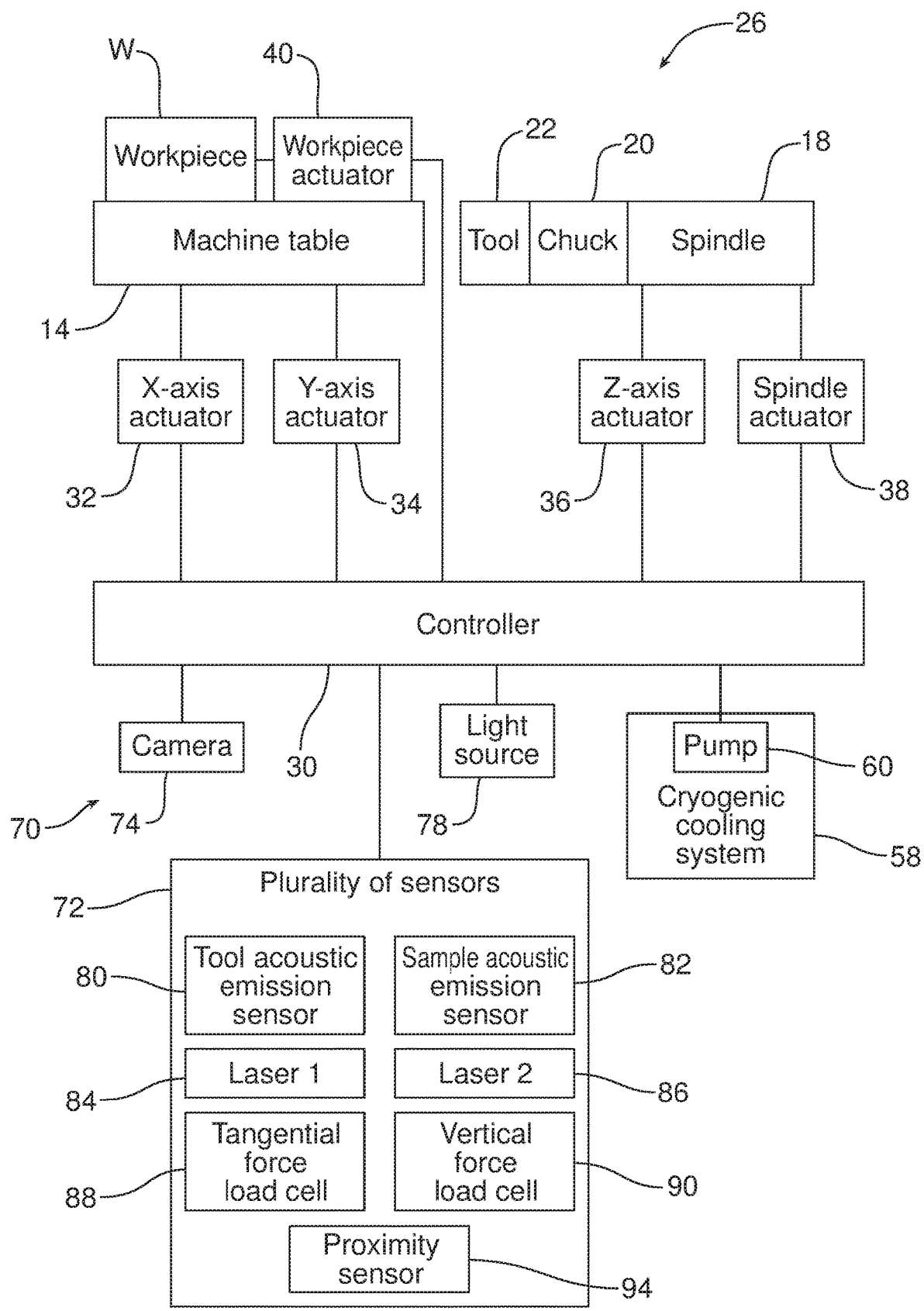
FIG. 3 is a schematic block diagram of the operation control system of the testbed device set forth in FIG. 1.

The operation control system 26 of the apparatus 10 is schematically illustrated in FIG. 3. The operation control system 26 includes a control module 28. The control module 28 includes a controller 30 adapted to control an X-axis actuator 32, a Y-axis actuator 34, a Z-axis actuator 36, a spindle actuator 38 and a sample or workpiece actuator 40.

More specifically, the controller 30 may comprise a computing device in the form of a dedicated microprocessor or an electronic control unit (ECU) running appropriate control software. The controller 30 may include one or more processors, one or more memories and one or more network interfaces communicating with each other over one or more communication buses.

The various actuators 32, 34, 36, 38 and 40 may comprise state-of-the-art actuators. For example, the X-axis actuator 32 and the Y-axis actuator 34 may comprise linear direction servomotors (for example: SGLFW2 Model linear servomotor from Yaskawa Electric Corporation coupled to an absolute linear encoder system such as the RESOLUTE™ RTLA-S absolute linear encoder system from Reinshaw PLC). The Z-axis actuator 36, the spindle actuator 39 and the workpiece actuator 40 may all comprise rotary servomotors (for example, Yaskawa SGM7A-25A). Using nanometer position and/or velocity feedback between the controller 30 and the actuators 32, 34, 36, 38 and 40, extremely high dynamic performance is achieved. Actuator operating parameters include greater than 5 Gs of acceleration, 4.5 m/s of peak speed and 50 nm absolute encoder feedback.

Figure 1B:
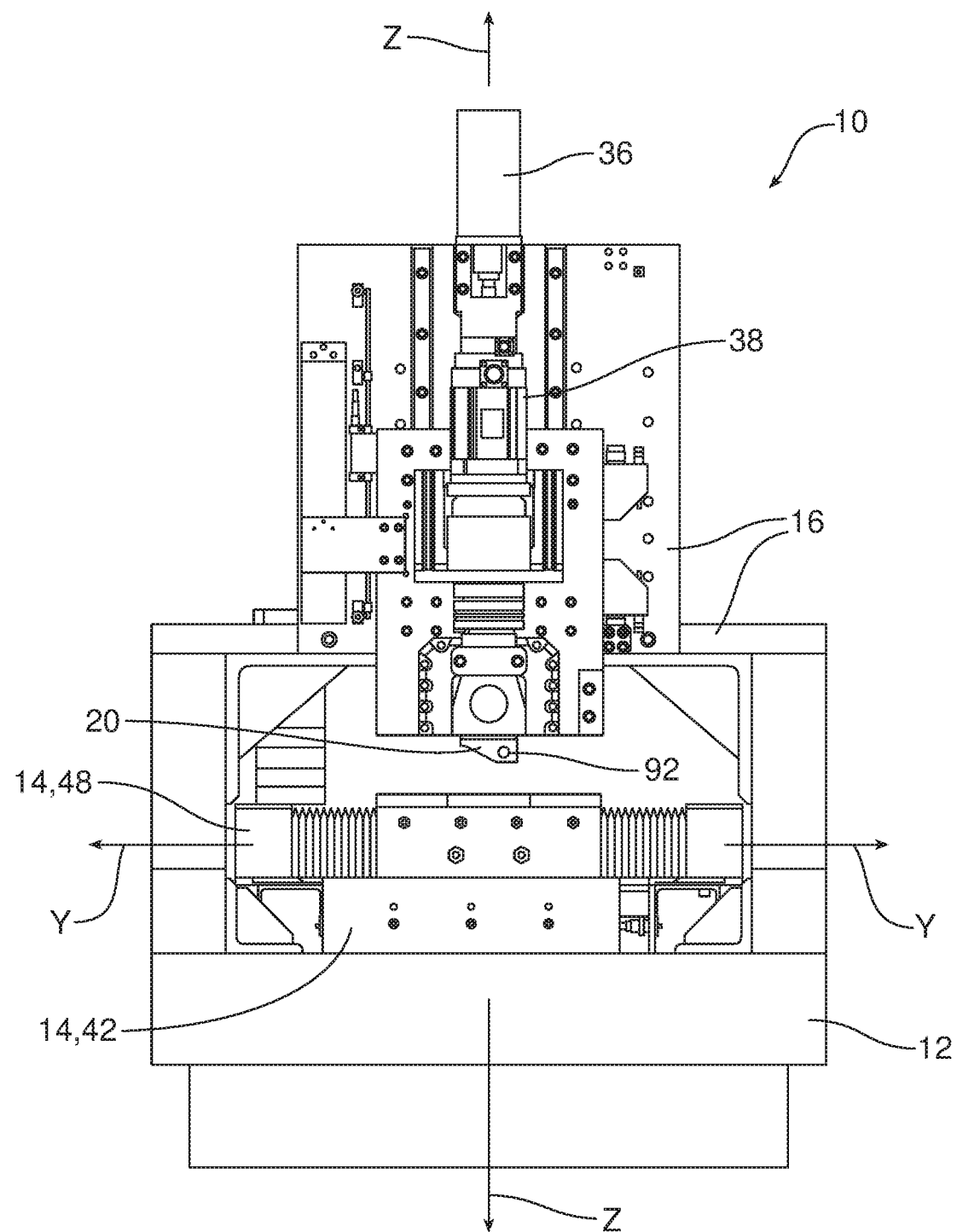
FIG. 1B is a front elevational view of the testbed device illustrated in FIG. 1A (sample holder not shown).
Figure 1C:
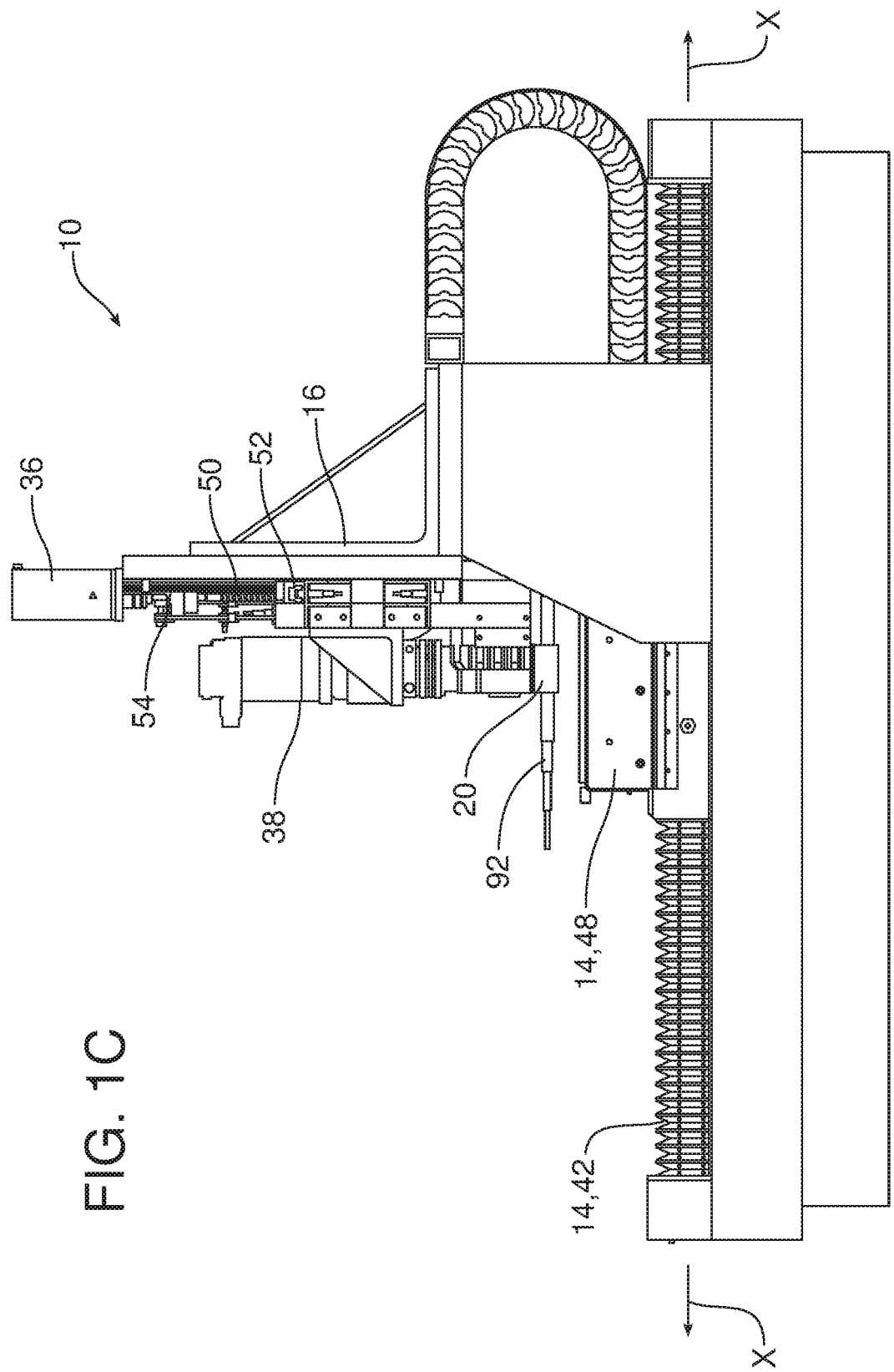
FIG. 1C is a left side elevational view of the testbed device illustrated in FIG. 1A (sample holder not shown).
Figure 1D:
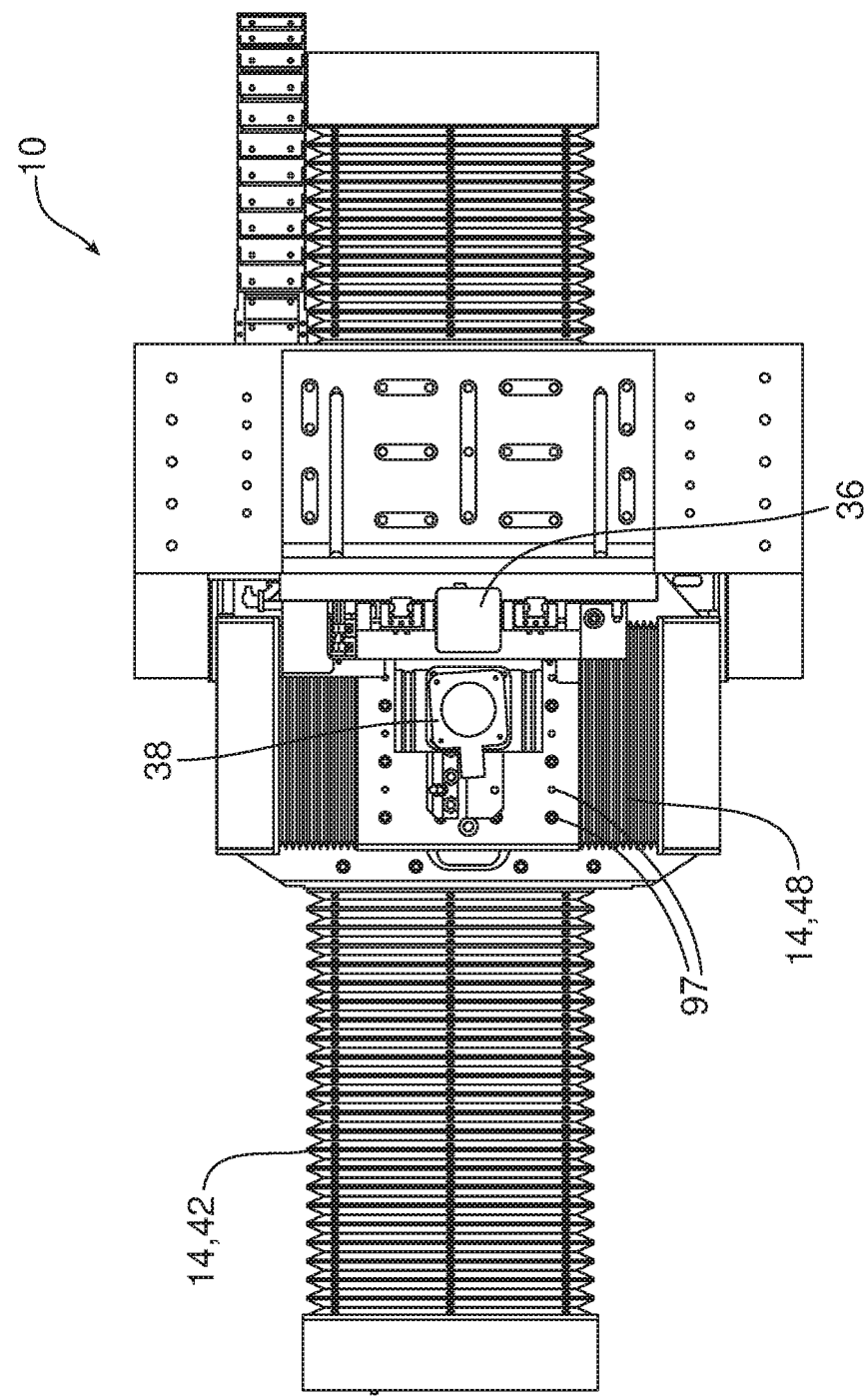
FIG. 1D is a top plan view of the testbed device illustrated in FIG. 1A.
Figure 2:
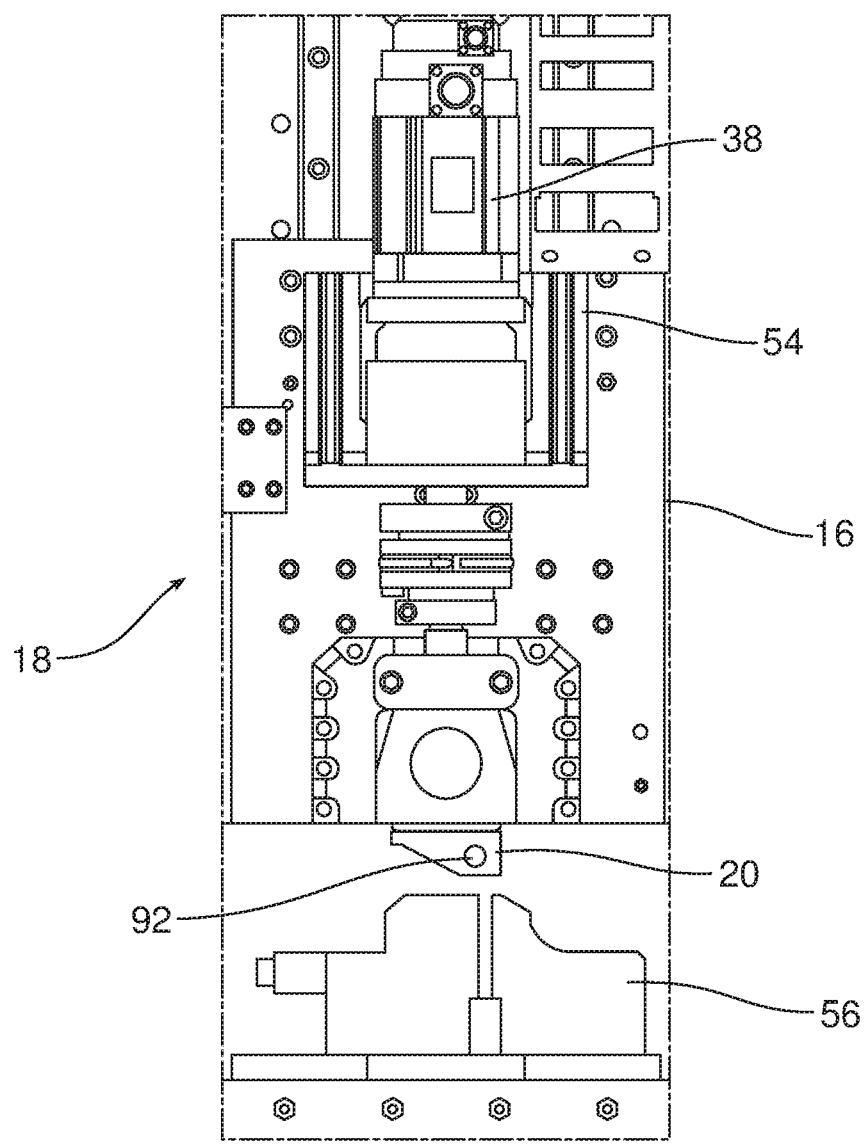
FIG. 2 is a detailed front elevational view of the displaceable spindle of the testbed device illustrated in FIG. 1.

The X-axis actuator 32 is held on the base 12 and is adapted to displace the displaceable machine table 14 in the X-axis direction or cutting direction (note action arrow X in FIG. 1C). The X-axis table 42 is supported by the X-axis actuator 32 riding on the magnetic track 44 held on the base 12 (note action arrows X).

The Y-axis actuator 34 rides on the magnetic track 46 supported on the X-axis table 42 and is adapted to displace the Y-axis table 48 of the displaceable machine table 14 in the Y-axis direction (note action arrow Y in FIG. 1B). The Z-axis actuator 36 is held on the column 16 of the base 12 and is adapted to displace the displaceable spindle 18 in a Z-axis direction toward or away from the displaceable machine table (note action arrow Z in FIG. 1B). As should be appreciated, the Z-axis actuator moves the cutting tool 22 held in the tool holder 20 in a manner defining the cutting stroke of the cutting tool 22. The rotary servomotor of the Z-axis actuator 36 rotates the ball screw 50 moving the ball screw nut 52 and the spindle 18 attached thereto along the Z-axis table 54 toward and away from the workpiece or sample W.

The spindle actuator 38 on the spindle axis S is a rotary servomotor adapted to index, rotate and align the cutting tool 22 held in the chuck 20 for proper engagement and clearance with the sample W held on the displaceable machine table 14. More particularly, the sample W may be firmly held in a vise, chuck or clamping device of a type known in the art (56) on the upper face of the machine table 14 or by other appropriate means useful for such a purpose.

The sample or workpiece actuator 40 is a rotary servomotor mounted on the displaceable machine table 14 along the sample or workpiece axis P that runs parallel to one of the X-axis X and the Y-axis Y of the displaceable machine table and is adapted to index the sample W on the machine table 14. More particularly, the workpiece actuator 40 rotates the sample W into a desired cutting position.

Advantageously, the controller 30 is configured to produce a number of different cutting features in the sample W with the cutting tool 22. Those cutting features include, but are not necessarily limited to a curved feature, a variable depth slot, a free-form slot and a pocket. A cryogenic cooling element 42, schematically illustrated in FIG. 3 may be used to provide cooling to the cutting tool 22 and the sample W during the planing operation. Such a cryogenic cooling system 58 may provide external cooling to the cutting tool 22 and the sample W by means of a closed-loop delivery system, of a type known in the art, including a cryogenic fluid circulated by a pump 60 under the control of the controller 30.

The testbed device 10 also includes data collection systems connected to the controller 30. Those data collection systems include a video microscopy system, generally illustrated at reference number 70, and a plurality of sensors generally illustrated at reference number 72.

Figure 4:
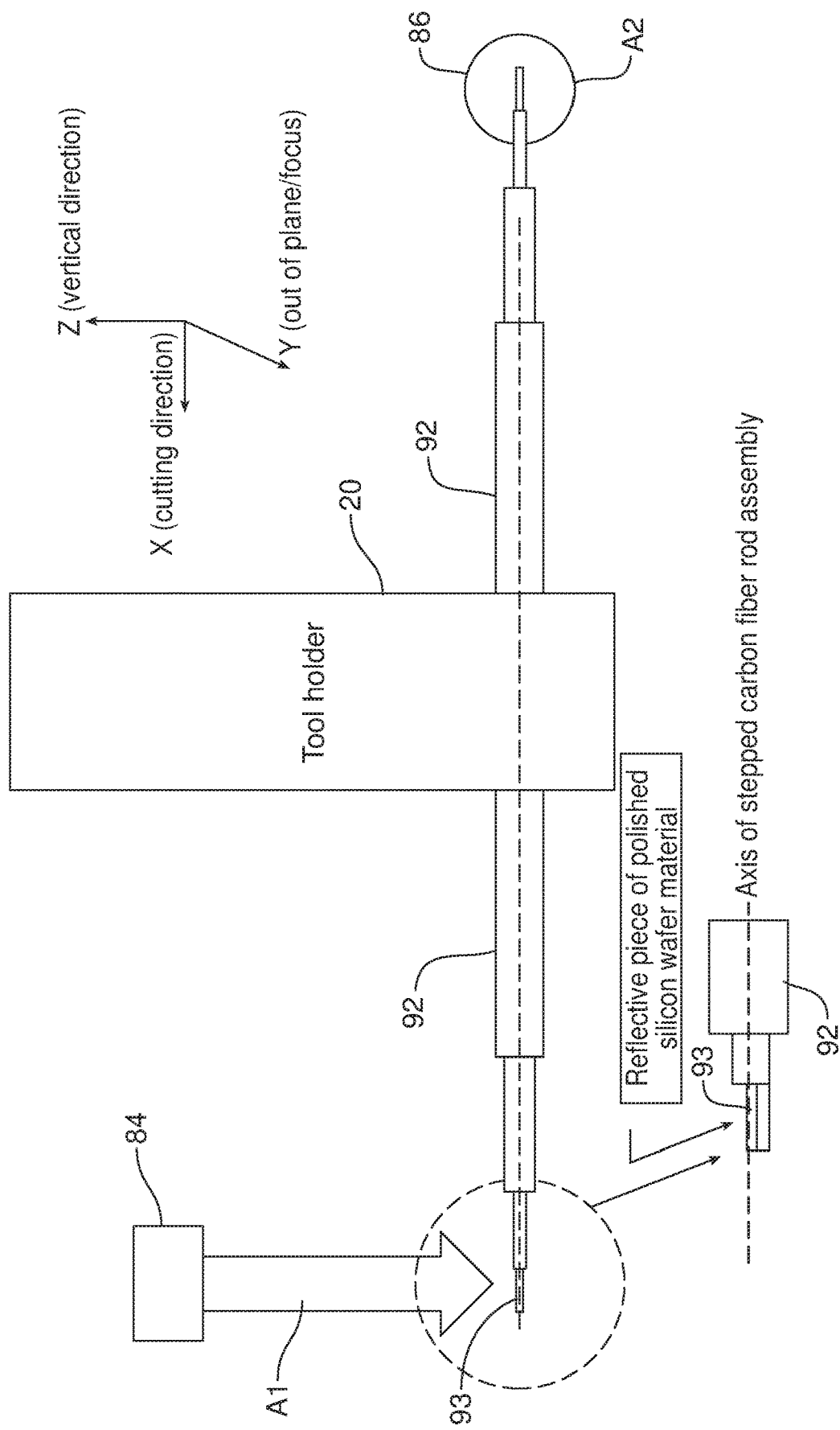
FIG. 4 is a schematic view illustrating the sapphire constraint positioned between the microscope of the video microscopy system and the sample.

More specifically, as best illustrated in FIG. 4 the video microscopy system 70 includes a camera 74, a microscope 76 and a light source 78. The camera 74 may comprise a model FASTCAM SA-Z Type 2100K ultra-high resolution camera made by Photron, or similar performance model of another manufacturer (e.g., IX Cameras model i-Speed 700 series or Vision Research model Phantom v2512). The light source 78 may be an ultra-high intensity LED fiber optic light source (>250 million lux).

The microscope 76 may comprise a Mitutoyo VMU-V video microscope unit providing 5x-50x magnification. The video microscopy system 70 may be supported on a stand, such as the tripod 75 illustrated in FIG. 1, that may be isolated from the base 12 of the testbed device 10. The video microscopy system 70 is configured to acquire images along the Y-axis perpendicular to the X-axis/cutting direction.

Advantageously, the video microscopy system 70 allows for nanosecond exposure microscopic (5x-50x) images at realistic cutting speeds (200-800 sfm), at optical resolution of approximately 550 nm at 50x magnification and frame rates up to greater than 10,000 per second, up to greater than 500,000 per second and in one particularly useful embodiment between 10,000 to 2,100,000 per second. In one or more of the many possible embodiments of the testbed device 10, the video microscopy system 70 functions to provide optical and/or thermographic measurements or data at real machine process speeds.

A sapphire constraint 77 (i.e. a slide of optical-quality (transparent and flat) sapphire "glass") is provided on the camera side of the sample W to constrain out-of-plane chip and workpiece material flow during cutting (see FIG. 4). The sapphire constraint 77 allows for plane-strain observation of in-plane material deformation by means of the video microscopy system 70.

Advantageously, it should be appreciated that the sapphire constraint 77 is IR-transparent and, therefore, also allows for infrared thermal measurements. Simple glass is too soft and susceptible to thermal shock to provide the function of the more durable sapphire constraint 77.

Using this video microscopy system 70 in conjunction with the high speed linear actuators 32, 34, 36, 38 and 40 enables the in-situ generation of highly detailed image sequences that can be analyzed using advanced digital image correction (DIC) techniques. DIC analysis reveals complex strain and strain rate fields, which in turn can be correlated with synchronized force data collected using the plurality of sensors 72 which may comprise low-cost strain gauges and accelerometers. Thus, for the first time, it is possible to fully characterize dynamic material behavior (constitutive stress/strain/temperature relationship) during the machining process.

Rather than relying on tensile, pressure plate or split Hopkinson bar test data, none of which realistically represent the conditions of hydrostatic stress and temperature gradients during the machining process, DIC analysis of orthogonal cuts in a given material and certain cutting edge combination can now be used to measure realistic flow stress and friction data. Also, unlike purely empirical data, such as that obtained during traditional cutting experiments, DIC reveals far more than merely the required cutting force. In fact, the data gathered on the ultra-high speed testbed can also be used to feed into analytical and/or numerical surface integrity models, allowing for drastically reduced calculation times. Output from such models could predict machining parameters that produce to a specified outcome (e.g., a certain residual stress profile), rather than the other way around, as is currently the case. The implications of computationally-efficient modeling to the design and manufacturing communities cannot be overstated, but this future state will only be achieved if better experimental data are available to improve the speed, efficiency and accuracy of simple analytical process models.

As best illustrated in FIG. 3, the plurality of sensors 72 may include: (a) a tool acoustic emission sensor 80 that is carried on or integrated into the tool holder 20, (b) a sample acoustic emission sensor 82 that is carried on or integrated into the sample holder 56, (c) a first laser interferometer/vibrometer 84, (d) a second laser interferometer/vibrometer 86, (e) a tangential force load cell 88 carried on or integrated into the tool holder and (f) at least one vertical force load cell 90 carried on or integrated into the displaceable machine table 14. Generally, the acoustic emission sensors 80, 82 and the force load cells 88, 90 may comprise the very latest generation of CMOS high resolution (2 Mpx), ultra-high throughput (16 Gpx/sec) sensory technology. For example, the tool acoustic emission sensor 80 and the sample acoustic emission sensor 82 may comprise a KISTLER Model 8152B Piezotron Acoustic Emission Sensor. The tangential force load cell 88 may comprise a FUTEK LLB300 (500 lbf capacity). The vertical force load cell(s) 90 may comprise FUTEK LLB300 (500 lbf capacity/ea).

Figure 5:
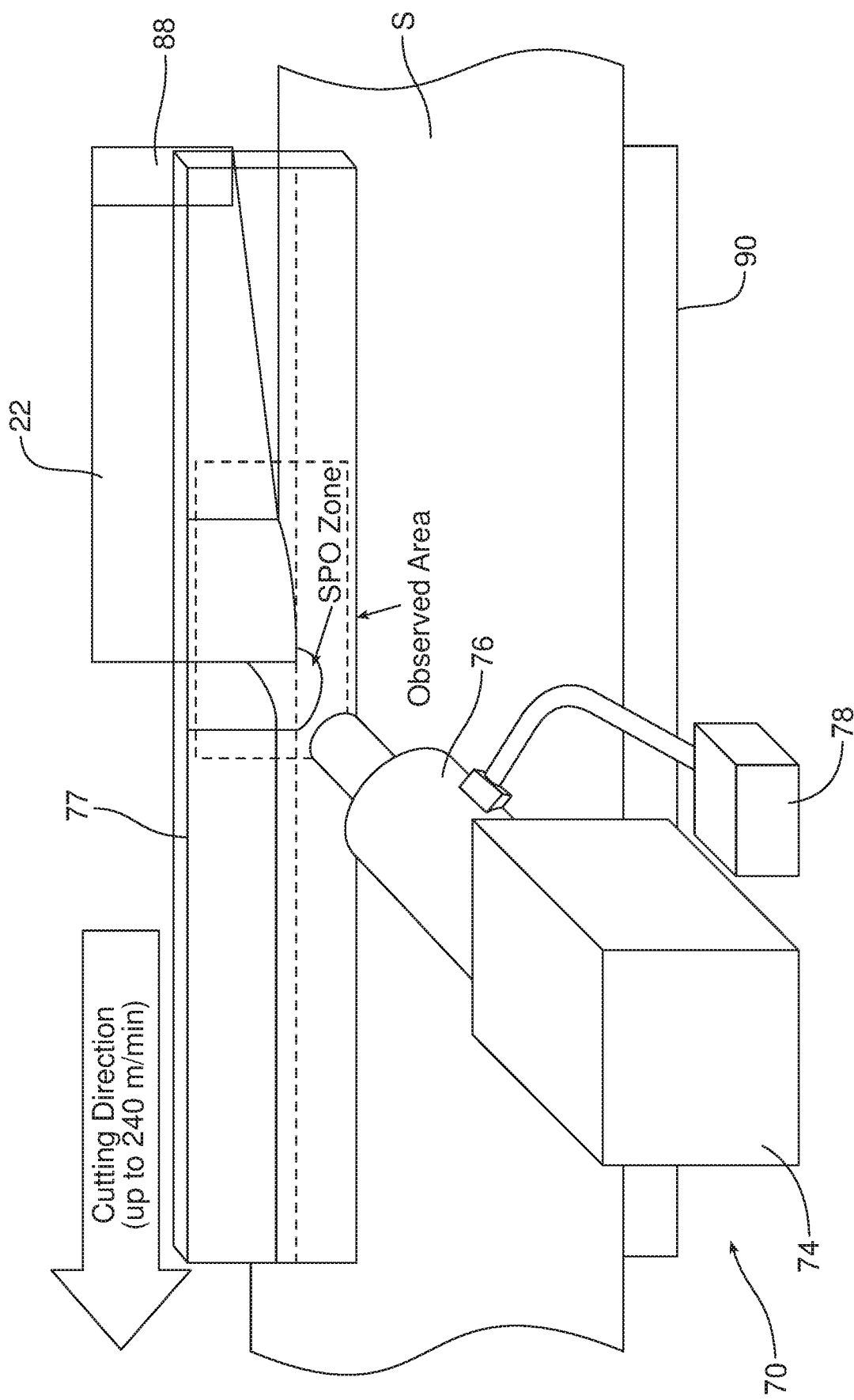
FIG. 5 is a schematic illustration of the lasers, interferometers and the carbon fiber rod used to detect vibration of the sample during the machining process.

The two laser interferometers 84, 86 function to measure vibration of the sample W during processing. More specifically, as illustrated in FIG. 5, a stepped carbon fiber rod 92 is carried on or integrated into the sample holder 56. The length and diameter of each step is optimized to simulate the natural frequency of each step. The carbon fiber rod 92 comprises a substantially parabolic taper having the stiffest possible shape with the highest natural frequency to avoid damping the vibrations elementary from the tool holder 56, without introducing any new or artificial vibrations. The cantilever construction is adapted to mechanically amplify vibrations produced in the sample W during the machining process. Thin optical targets 93 of highly reflective polished silicon or other appropriate material are carried on the carbon fiber rod 92 (one at each end). The laser interferometers 84, 86 pick up the movement of the targets 93 on the carbon fiber rod 92 thereby providing vibration data to the controller 30.

More specifically, as illustrated in FIG. 5, the carbon fiber rod 92 has a longitudinal axis that extends along the X-axis (i.e. cutting direction) of the device 10. The first laser interferometer 84 targets the carbon fiber rod 92 along a first line or axis A1 aligned on the Z-axis (i.e. vertical axis) of the device 10. The second laser interferometer 86 targets the carbon fiber rod 92 along a second axis A2 aligned on the Y-axis (i.e. horizontal axis) of the device 10 (running out of the Figure toward the viewer). Thus, it should be appreciated that axis A1 and axis A2 are both perpendicular to each other and to the cutting direction axis.

Figure 6:
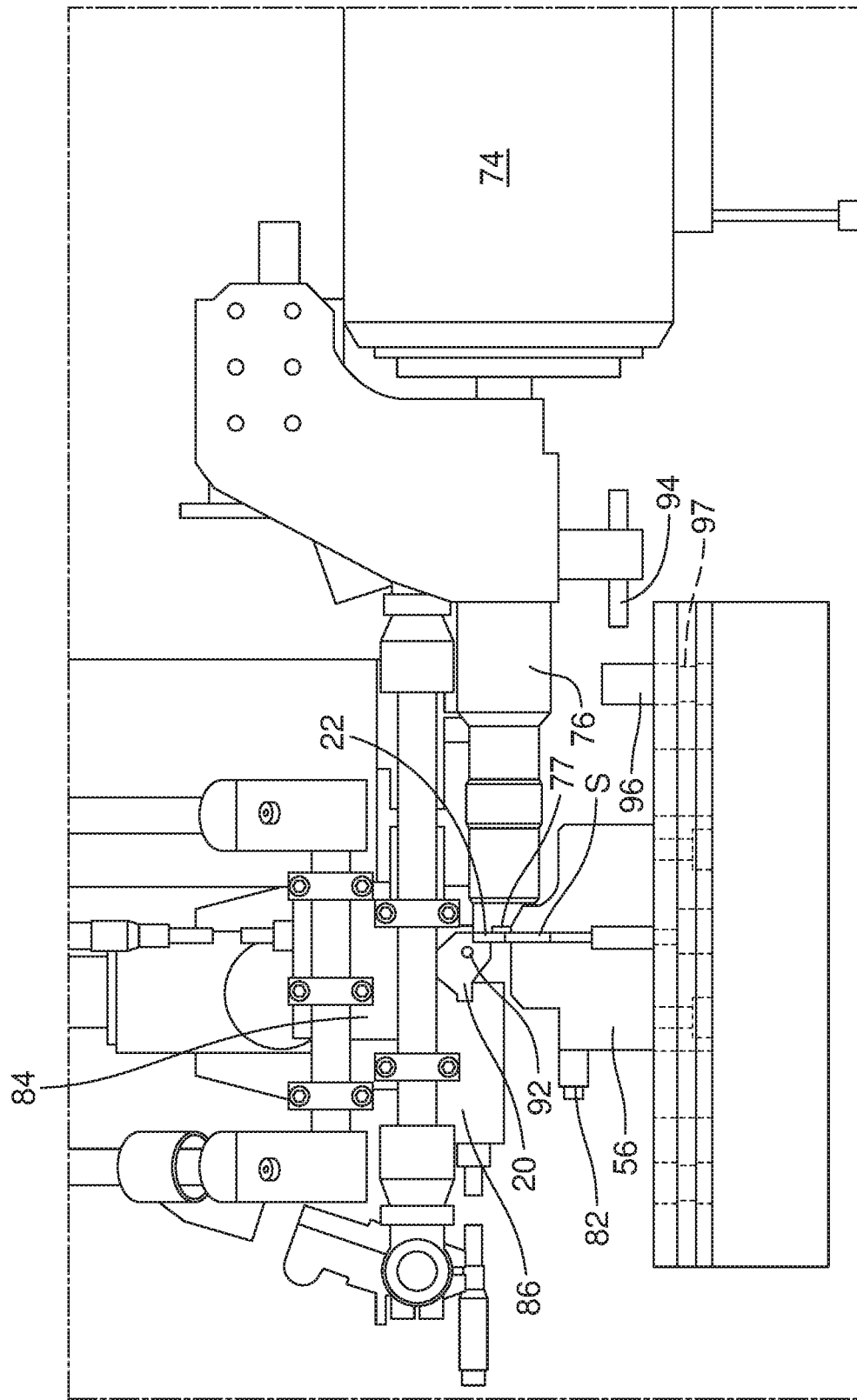
FIG. 6 is a schematic illustration of the proximity sensor and the data acquisition marker used to initiate and end data collection.

As illustrated in FIG. 6, the plurality of sensors 72 may also include a proximity sensor 94, such as a hall-effect sensor or switch of a type known in the art, that is carried on the video microscopy system 70. Further, a data acquisition end point marker 96, of metal or other appropriate material may be screwed into any one of a series of tapped holes 97 in the side of the displaceable machine table 14 at the desired location relative to the sample W held in the sample holder 56.

The data acquisition end point marker 96 allows for the start and end of data acquisition to be set. The proximity sensor 94 outputs a standard 24 vdc signal when close to the marker 96. The proximity sensor output pulse also serves to synchronize all of the plurality of sensors 72 and provides a reference point for the manifold data streams within the data acquisition system.

An alternative and more sophisticated embodiment of the testbed device 10 (illustrated in FIG. 6) may involve the camera and associated optical system 70 directly fixtured to the vertical stage of the machine. In such a configuration, the camera 74 is vertically supported by a gas strut of sufficient capacity to counter the weight of the camera and microscope unit. Moreover, the video microscope unit is attached to a 3-axis (xyz) optical stage, such as a Newport Model 462-XYZ-M stage, which allows for fine focus and position control of the microscope. The means of attaching the microscope to the xyz stage may involve a carbon fiber composite bracket to dampen vibrations, while simultaneously providing high stiffness at low weight, to reduce undesirable movement and vibrations of the microscope assembly. Finally, the camera 74 is rigidly supported by means of a third point, comprised of an adjustable support arm, such as a NOGA Large Cine Arm MG9038CA. By supporting the video system 70 at three points, with freedom to move vertically, it is possible to maintain an initially set precise focus on the cutting edge, or other region of interest, even as the machine moves vertically during variable depth of cut operations, such as tapered cuts or 2D simulations of milling operations. When a fixed camera on a tripod is utilized, only a single cut can be performed until the vertical position of the microscope will need to be readjusted. Thus, the adjustable optical system embodiment is considered preferable for conducting multiple tests without continuous need to re-set the optical system. This advantage is considered to be a significant advantage over previous systems, which generally involve no connection between the camera and a vertical axis (I am actually not aware of any comparable system with any vertical axis; it is usually just a single 'x' axis and a fixed tool).

The testbed device 10 described above allows for the data acquisition needed for use in in-situ characterization to inform modeling of the machining processes. Thus, the testbed device 10 is useful to:

(a) Conduct in-situ characterization of proprietary testbed and relevant process regimes (cutting speed, chip thickness, tool edge radii and wear levels) to determine relevant model inputs (e.g., contact widths and forces for thermal and mechanical modeling);

(b) Use in-situ characterized model inputs to carry out predictive modelling and compare with measure results in case of deviations, determine cause of uncertainty and repeat relevant measurements or adjust scaling variables;

(c) Conduct 2D to 3D model transition, using discretization of 3D uncut chip thickness variation and integration of in-situ determined 2D behavior (e.g., cutting forces and temperature vs chip thickness relationships);

(d) Conduct limited 3D validation (e.g., milling or turning trials) and compare resulting surface integrity, forces and temperature to predicted values; in case of deviation, repeat step (b), i.e., adjust model inputs and scaling factors to achieve convergence.

In-situ cutting process variables used in the analysis and modelling include:

(1) Full-field sub-surface temperature distribution using high speed camera and thermographic phosphor technique;

(2) Sub-surface strain evolution and strain rate fields, at 200 nm spatial resolution and up to 2 million frames/second;

(3) Residual stress evolution (micro-strain evolution in sub-surface);

(4) Cutting forces (0.1 N resolution, 5 kN max force, 50 kHz useful bandwidth);

(5) Size effects, including values of minimum chip thickness and microstructure effects on chip formation;

(6) Characteristics tool/workpiece contact widths for cutting edge preparations;

(7) Dynamic cooling/lubrication effects on friction, flow stress and surface integrity evolution;

(8) Variable state of friction along the tool/workpiece interface, including coating effects;

(9) Acoustic emissions (fracture mechanics in cutting of brittle materials at 900 kHz bandwidth);

(10) Tool vibrations and high-frequency cyclical chip formation (200 kHz laser interferometers).

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A testbed device, comprising:
a base;
a displaceable machine table supported on the base;
a sample holder supported on the displaceable machine table;
a displaceable spindle supported on the base;
a video microscopy system, including a camera, a microscope and a light source;
a plurality of sensors adapted to measure force, vibration and thermal emission;
a tool holder carried on the displaceable spindle, the tool holder being adapted to hold a cutting or burnishing tool; and
a control module including a controller, an X-actuator, a Y-actuator and a Z-actuator wherein the controller is adapted to (a) control the X-actuator, the Y-actuator and the Z-actuator, (b) receive data from the plurality of sensors, and (c) receive data images from the video microscopy system wherein the testbed device further includes a carbon fiber rod assembly integrated into the tool holder, a first laser interferometer targeting a first target element at a first end of the carbon fiber rod along a first line and a second laser interferometer targeting a second target element at a second end of the carbon fiber rod along a second line perpendicular to the first line.

2. The testbed device of claim 1, wherein the plurality of sensors include a tool acoustic emission sensor integrated into the tool holder.

3. The testbed device of claim 2, wherein the plurality of sensors include a sample acoustic emission sensor integrated into the sample holder.

4. The testbed device of claim 3, wherein the plurality of sensors include a tangential force load cell integrated into the tool holder.

5. The testbed device of claim 4, wherein the plurality of sensors include at least one vertical force load cell integrated into the displaceable machine table.

6. The testbed device of claim 5, wherein said plurality of sensors have a sampling rate of at least 2 MHz/channel.

7. The testbed device of claim 6, wherein the camera has a frame speed of at least 10,000 frames per second.

8. The testbed device of claim 7, wherein the camera has a frame speed of at least 500,000 frames per second.

9. The testbed device of claim 7, wherein said microscope provides image magnification of 5×-50×.

10. The testbed device of claim 9, wherein said light source provides greater than 250 million lux.

11. The testbed device of claim 1, wherein the video microscopy system provides optical resolution of approximately 550 nm at 50× magnification.

12. The testbed device of claim 1, wherein the X-actuator, the Y-actuator and the Z-actuator all provide greater than 5 Gs of acceleration, 4.5 m/s of peak speed and 50 nm absolute encoder position feedback.

13. The testbed device of claim 1, further including a sapphire constraint between a sample held in the sample holder and the camera.

14. The testbed device of claim 1, further including a stationary proximity sensor and a data acquisition end point marker supported on the displaceable machine table.

15. The testbed device of claim 1, wherein the camera has a frame speed of at least 10,000 frames per second.

16. The testbed device of claim 1, wherein the camera has a frame speed of at least 500,000 frames per second.

17. The testbed device of claim 1, wherein the camera has a frame speed of between 10,000 and 2,100,000 frames per second.

* * * * *